United States Patent
Tokura et al.

(10) Patent No.: US 7,768,698 B2
(45) Date of Patent: Aug. 3, 2010

(54) RAMAN AMPLIFIER AND OPTICAL COMMUNICATION SYSTEM

(75) Inventors: Toshiyuki Tokura, Tokyo (JP); Katsuhiro Shimizu, Tokyo (JP); Tasuku Fujieda, Tokyo (JP); Ken'ichi Asakawa, Tokyo (JP); Hitoshi Mikada, Tokyo (JP); Katsuyoshi Kawaguchi, Tokyo (JP)

(73) Assignees: Independent Administrative Institution, Japan Agency for Marine-Earth Science and Technology, Kanagawa (JP); Mitsubishi Electric Corporation, Tokyo (JP)

(*) Notice: Subject to any disclaimer, the term of this patent is extended or adjusted under 35 U.S.C. 154(b) by 193 days.

(21) Appl. No.: 11/661,502

(22) PCT Filed: Aug. 30, 2004

(86) PCT No.: PCT/JP2004/012502

§ 371 (c)(1),
(2), (4) Date: Feb. 27, 2007

(87) PCT Pub. No.: WO2006/025095

PCT Pub. Date: Mar. 9, 2006

(65) Prior Publication Data

US 2008/0013161 A1     Jan. 17, 2008

(51) Int. Cl.
*H04B 10/17* (2006.01)
(52) U.S. Cl. .................. 359/334; 359/341.31
(58) Field of Classification Search .............. 359/334, 359/341.31, 341, 31
See application file for complete search history.

(56) References Cited

U.S. PATENT DOCUMENTS

| | | | | |
|---|---|---|---|---|
| 4,408,307 | A * | 10/1983 | Harris | 367/79 |
| 4,786,140 | A * | 11/1988 | Melman et al. | 385/5 |
| 5,880,866 | A * | 3/1999 | Stolen | 398/101 |
| 6,188,508 | B1 * | 2/2001 | Horiuchi et al. | 359/334 |
| 6,384,963 | B2 | 5/2002 | Ackerman et al. | |
| 6,456,426 | B1 * | 9/2002 | Bolshtyansky et al. | 359/334 |
| 6,496,634 | B1 | 12/2002 | Levenson | |
| 6,633,712 | B2 * | 10/2003 | Dennis et al. | 385/123 |
| 6,693,740 | B2 * | 2/2004 | Gray et al. | 359/337.4 |

(Continued)

FOREIGN PATENT DOCUMENTS

EP    0963065 A2    12/1999

(Continued)

OTHER PUBLICATIONS

Imai et al., The Institute of Electronics, Information and Communication Engineers (IEICE) Communications Society Conference B-10-107 (Imai et al.), pp. 395 with English language translation.

*Primary Examiner*—Eric Bolda
(74) *Attorney, Agent, or Firm*—Birch, Stewart, Kolasch & Birch, LLP

(57) ABSTRACT

A Raman amplifier includes a pumping light source, an optical coupler, and a Raman amplifier medium. The pumping light source outputs a pumping light that is intensity-modulated with a frequency equal to or higher than 100 megahertz. The optical coupler couples the pumping light with a carrier light. The Raman amplification medium is pumped by the pumping light to amplify the carrier light. The Raman amplification medium has characteristics of a low dispersion and a small difference between propagation times of the carrier light and the pumping light.

14 Claims, 5 Drawing Sheets

U.S. PATENT DOCUMENTS

| | | | |
|---|---|---|---|
| 6,748,136 B2 * | 6/2004 | Headley et al. | 385/27 |
| 2003/0011855 A1 * | 1/2003 | Fujiwara | 359/177 |
| 2003/0035184 A1 * | 2/2003 | Deguchi et al. | 359/177 |
| 2003/0035207 A1 * | 2/2003 | Gray et al. | 359/344 |
| 2003/0081307 A1 * | 5/2003 | Fludger et al. | 359/334 |
| 2003/0210876 A1 | 11/2003 | Gaarde et al. | |

FOREIGN PATENT DOCUMENTS

| | | | |
|---|---|---|---|
| EP | 1361463 | A1 | 11/2003 |
| JP | 11-344732 | A | 12/1999 |
| JP | 2001-133818 | A | 5/2001 |
| JP | 2001-311973 | A | 11/2001 |
| JP | 2003-329870 | A | 11/2003 |
| JP | 2004-14537 | A | 1/2004 |
| WO | WO-2005/124446 | A1 | 12/2005 |

\* cited by examiner

RAMAN AMPLIFIER AND OPTICAL COMMUNICATION SYSTEM

TECHNICAL FIELD

The present invention relates to a Raman amplifier that intensity modulates a signal in high frequency equal to or higher than 100 megahertz, and an optical communication system that uses the Raman amplifier.

BACKGROUND ART

As a method of modulating a signal into carrier light using an optical amplifier, a method of modulating the intensity of pumping light to be supplied to an amplification medium, and modulating a gain is used. An erbium-doped optical fiber amplifier (EDFA) that uses an EDF (Erbium-Doped Fiber) for an amplification medium, and a Raman amplifier that uses an optical fiber using quartz for a base material, for an amplification medium, are used as optical amplifiers. Patent Document 1 and Nonpatent Literature 1 disclose that the Raman amplifier is more suitable than the EDFA, to execute modulation in a relatively high frequency.

Patent Document 1: Japanese Patent Application Laid-Open No. H11-344732

Patent Document 2: Japanese Patent Application Laid-Open No. 2001-311973

Nonpatent Literature 1: The Institute of Electronics, Information and Communication Engineers (IEICE) Communications Society Conference B-10-107 "Study on Gain Modulation Characteristics of Distributed Raman Amplification Line", 2002 (Imai et., al.)

DISCLOSURE OF INVENTION

Problem to be Solved by the Invention

However, as disclosed in the Patent Document 1 or the Nonpatent Literature 1, a modulation system using the technique of Raman amplifier that is known only modulates a monitor control signal at a relatively low speed in an optical transmission system. Therefore, a modulation frequency in the conventional Raman amplifier is relatively low, and is less than 10 megahertz at most. While the Patent Document and the Nonpatent Literature suggest a possibility of being able to modulate in a higher frequency, a Raman amplifier that can actually modulate in a high frequency is not disclosed therein.

On the other hand, various suitable conditions are studied in which a Raman amplifier is used to obtain a constant gain. For example, as disclosed in Patent Document 2, it is known that a satisfactory amplification characteristic can be obtained by suitably setting conditions of pumping light and an optical fiber. However, the conditions disclosed in the Patent Document 2 are used to obtain an amplification characteristic of a constant gain with low noise free from change in time, and these conditions are not used to modulate a signal by positively changing the gain.

The present invention has been achieved in view of the above points. It is an object of the present invention to provide a Raman amplifier that modulates a signal of a frequency equal to or higher than 100 megahertz, the Raman amplifier having a small installation area, high reliability, small polarization dependency or wavelength dependency of modulated carrier light, and little insertion loss of carrier light, and an optical communication system that uses the Raman amplifier.

Means for Solving Problem

To overcome the above problems and achieve the object mentioned above, according to the present invention, a Raman amplifier that amplifies carrier light by using a Raman amplification medium includes: a pumping light source that supplies pumping light that is intensity-modulated in a frequency equal to or higher than 100 megahertz to the Raman amplification medium; and a multiplexer that multiplexes the carrier light and the pumping light, and guides multiplexed light to the Raman amplification medium, wherein the Raman amplification medium has a low dispersion characteristic, and has a small difference between a propagation time of the carrier light and a propagation time of the pumping light.

EFFECT OF THE INVENTION

The Raman amplifier according to the embodiment of the present invention employs a Raman amplification medium that has a low dispersion characteristic and has a small difference between a propagation time of carrier light and a propagation time of pumping light. Therefore, the Raman amplifier that modulates a signal by positively changing a gain can intensity-modulate the signal in a high frequency equal to or higher than 100 megahertz.

EXPLANATIONS OF LETTERS OR NUMERALS

Figure 1:
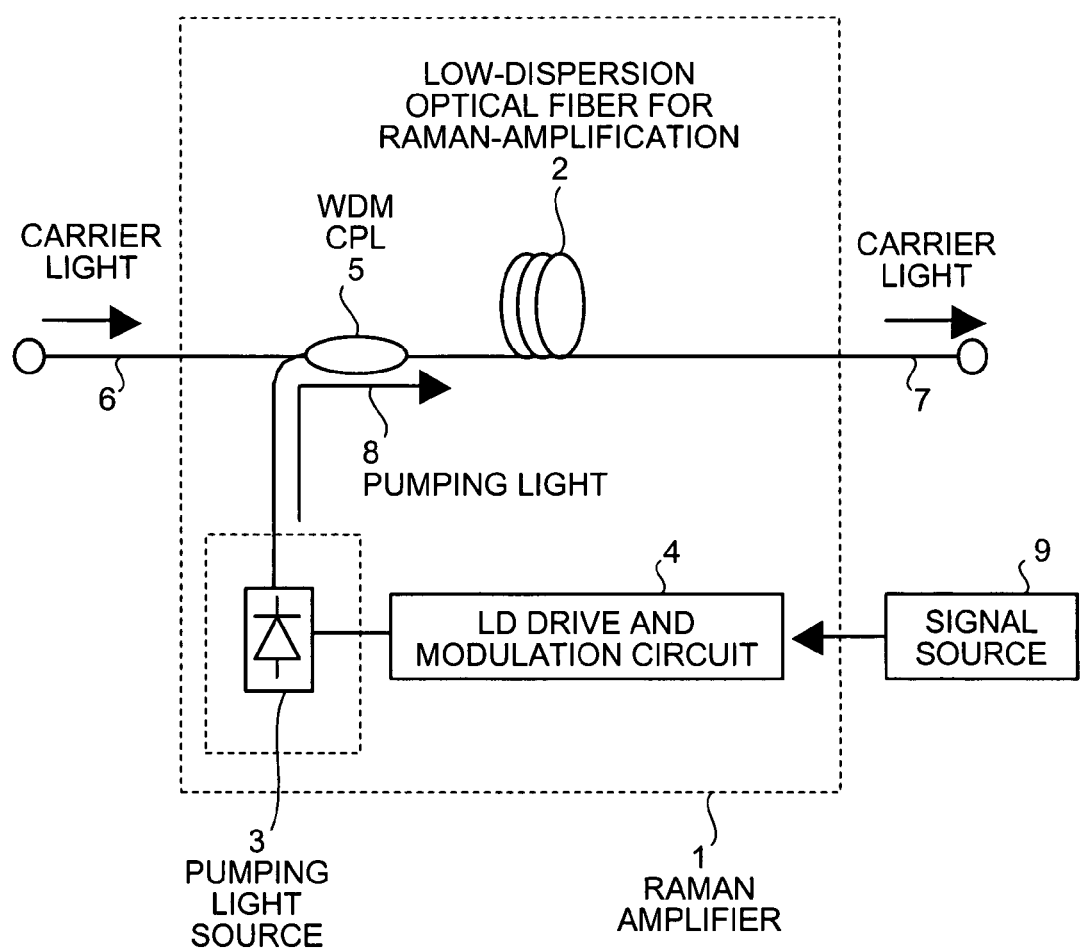
FIG. 1 is a configuration diagram of a Raman amplifier according to a first embodiment.

1 Raman amplifier
2 Raman-amplification optical fiber
3 Pumping light source
4 LD drive and modulation circuit
5 WDM multiplexer
6 Input terminal
7 Output terminal
8 Pumping light
9 Signal source.

BEST MODES FOR CARRYING OUT THE INVENTION

Exemplary embodiments of a Raman amplifier according to the present invention will be explained in detail with reference to the drawings. The present invention is not limited to the embodiments.

First Embodiment

FIG. 1 is a configuration diagram of a Raman amplifier according to a first embodiment. As shown in FIG. 1, a Raman amplifier 1 according to the first embodiment includes a low-dispersion optical fiber for Raman-amplification 2 as a Raman amplification medium, a pumping LD (Laser Diode) 3 as a pumping light source, an LD drive and modulation circuit 4 that drives the pumping LD and modulates the LD light, a WDM (Wavelength Division Multiplex) multiplexer 5 that multiplexes pumping light 8 and carrier light, an input terminal 6 of an optical fiber to which the carrier light is input, and an output terminal 7 of the optical fiber from which the signal light, or intensity-modulated carrier light is output. A reference numeral 9 denotes a signal source of 100 megahertz from which a signal is applied to the Raman amplifier 1.

The carrier light input from the input terminal 6 is guided to the Raman-amplification optical fiber 2 via the WDM multiplexer 5, and is output from the output terminal 7. The WDM multiplexer 5 efficiently multiplexes the pumping light and the carrier light having different wavelengths, and guides the multiplexed wave to the same optical fiber. While a fiber fused taper WDM multiplexer or a dielectric film filter WDM multiplexer is employed, other WDM multiplexing unit can also be used.

The LD drive and modulation circuit 4 drives the pumping LD 3 based on a signal that is output from the signal source 9. The intensity-modulated pumping light 8 is guided to the Raman-amplification optical fiber 2 via the WDM multiplexer 5. The LD drive and modulation circuit 4 can directly execute a baseband modulation of modulating the pumping light in the intensity according to 0 or 1 of the signal from the signal source 9. Alternatively, the LD drive and modulation circuit 4 can execute a sub-carrier modulation of modulating the pumping light after electrically superimposing the signal on a sub-carrier wave having a higher frequency for example. Since the intensity of the pumping light is modulated, the Raman-amplification optical fiber 2 modulates the gain applied to the carrier light. As a result, the intensity-modulated carrier light is output from the output terminal 7.

In FIG. 1, the Raman-amplification optical fiber 2 has a forward pump configuration for propagating the pumping light and the carrier light in the same direction. It is known from the Nonpatent Literature 1 and the like that the forward pump type is more suitable for modulation in a high frequency. Further, according to the present invention, the Raman-amplification optical fiber 2 has a low dispersion characteristic for modulating the carrier light in the high frequency of 100 megahertz of the signal source 9, thereby making a small difference between the propagation time of the carrier light and the propagation time of the pumping light.

Figure 2:
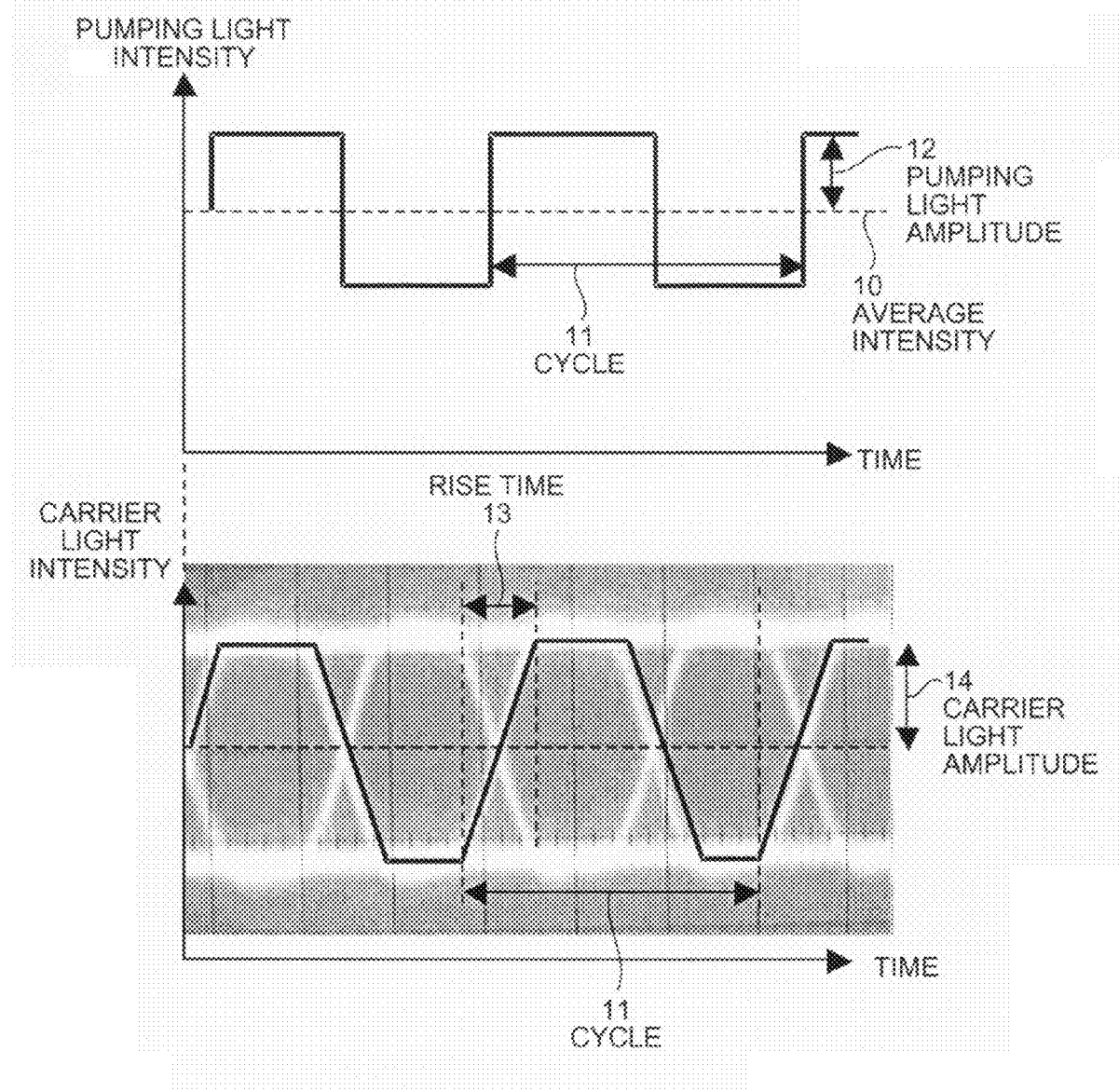
FIG. 2 is an explanatory diagram of a relation between a dispersion characteristic of an optical fiber and an upper limit of a modulation frequency.

FIG. 2 is an explanatory diagram of a relation between a dispersion characteristic of an optical fiber and an upper limit of a modulation frequency. A relation between the dispersion characteristic of the optical fiber 2 and an upper limit of the modulation frequency is explained. Consider, for example, that an absolute value of a dispersion value of a Raman-amplification optical fiber is 26 ps/nm/km, a length of this optical fiber is 6.1 kilometers, a wavelength of carrier light is 1,550 nanometers, and a wavelength of pumping light is 1,450 nanometers. A difference between the wavelengths of both lights is 100 nanometers. As shown in FIG. 2, when the intensity of the pumping light is modulated in average intensity 10, a cycle 11, and a pumping light amplitude 12, the carrier light is modulated in a carrier light amplitude 14. A lower side in FIG. 2 shows a measured wavelength of the carrier light when the carrier light is modulated in a modulation frequency of 30 megahertz.

It should be noted that the intensity of the pumping light is modulated in a rectangle, and a rise time 13 of the modulated carrier light takes a few nanoseconds, although the time required for the rising is sufficiently small. When the modulation frequency is further increased, the period 11 becomes short. However, the rise time 13 remains unchanged. A required fall time is also about the same as the rise time. Therefore, when the total of the rise time and the fall time coincides with the cycle 11, the modulation frequency becomes an upper limit.

The rise time and the fall time that determine the upper limit of the modulation frequency are comes from a difference between the propagation time of the carrier light and the propagation time of the pumping light depending on a difference between the wavelengths of these lights, based on a dispersion characteristic of the Raman-amplification optical fiber 2. In other words, the carrier light and the pumping light that are simultaneously incident to the Raman-amplification optical fiber 2 have a time difference when these lights are output from the output terminal 7 of the optical fiber 2, based on the dispersion characteristic of the Raman-amplification optical fiber 2. The intensity of the carrier light is modulated during the propagation in the optical fiber 2. However, since a time difference occurs between the carrier light and the pumping light, a modulation waveform becomes slow, and a limited rise time occurs. In the first embodiment, the Raman-amplification optical fiber 2 has a low dispersion characteristic, thereby shortening the rise time. With this arrangement, the Raman amplifier can modulate the carrier light in a higher frequency than ever achieved.

In the conditions shown in FIG. 2, deviation time is estimated as follows:

(absolute value of dispersion value of optical fiber, 26 ps/nm/km)×(length of optical fiber, 6.1 kilometers)×(difference between wavelength of pumping light and wavelength of carrier light, 100 nanometers)=16 ns.

Therefore, $1/16$ ns=63 MHz is a rough estimation of the upper limit of the modulation frequency. In this condition, the carrier light cannot be modulated in the frequency of 100 megahertz.

When a length of the Raman-amplification optical fiber is assumed as 6.1 kilometers, wavelengths of the carrier light and the pumping light are assumed as 1,550 nanometers and 1,450 nanometers, respectively, and an absolute value of a dispersion value of the optical fiber 2 is assumed smaller than 1/[(modulation frequency of pumping light source, 100 megahertz [THz])×(length of optical fiber, 6.1 kilometers)×(difference between wavelength of pumping light and wavelength of carrier light, 100 nanometers)]=16 ps/nm/km, the carrier light can be modulated in the signal source 9 of the frequency of 100 megahertz.

The Patent Document 2 discloses a Raman amplifier that amplifies light with a constant gain without variation, by eliminating the influence of noise of a pumping light source. For this purpose an optical fiber having a small dispersion value is used. On the other hand, according to the first embodiment, the Raman amplifier uses the optical fiber 2 having a small dispersion value to positively modulate the intensity of the carrier light by using the pumping light that is intensity-modulated in a high frequency. In other words, both Raman amplifiers are common in that they use an optical fiber having a small dispersion value. However, the former does not have a viewpoint of positively changing the amplified light at all.

As described above, according to the first embodiment, the Raman-amplification optical fiber 2 having a small dispersion value is used to execute Raman amplification. Therefore, the Raman amplifier can modulate a signal of a high frequency equal to or higher than 100 megahertz.

Second Embodiment

In the first embodiment, a Raman gain coefficient of an optical fiber used for measurement shown in FIG. 2 is 2.5/ W/m that is relatively higher than a Raman gain coefficient of a general optical fiber. When an optical fiber having a higher gain coefficient is used, the upper limit of the modulation speed can be increased. When a gain coefficient is larger, the gain obtained from the same intensity of the pumping light and the same optical fiber length becomes higher. In other words, when a Raman-amplification optical fiber having a large gain coefficient is employed, carrier light can be intensity-modulated in a short optical fiber length. Consequently, a propagation delay time can decreases in the optical fiber.

For example, when an optical fiber is used that has a gain coefficient of 5/W/m which is about two times larger than the above, as described in The Institute of Electronics, Information and Communication Engineers, Electronics Society Conference C-3-62, "Study on the Concentrated Raman Amplifier Fiber", 2003 (Taniguchi, et., al.), a sufficient modulation amplitude of carrier light can be obtained in a length of 3 kilometers which is about a half length of the optical fiber.

When the Raman-amplification optical fiber 2 having the Raman gain coefficient of 5/W/m is employed under the condition of the first embodiment, the upper limit of the modulation frequency becomes as follows:

1/[(absolute value of dispersion value of optical fiber, 16 ps/nm/km)×(length of optical fiber, 3 kilometers)×(difference between wavelength of pumping light and wavelength of carrier light, 100 nanometers)]=208 MHz.

In other words, when the optical fiber having the characteristic of a high Raman gain coefficient as well as having a small absolute value of a dispersion value is used, the upper limit of the modulation frequency can further increase. When the optical fiber 2 becomes short, the Raman amplifier 1 can be made small. Further, since the loss of carrier light in the Raman amplifier 1 can decrease, a low-loss modulator can be obtained.

The pumping light source 3 in the first embodiment is a laser diode having a wavelength of 1,450 nanometers. A highly reliable laser diode showing solid performance in a submarine repeater of an EDFA can be used for this laser diode. Further, when the pumping light source 3 has a redundant configuration using plural pump laser diodes, much higher reliability can be obtained. The WDM multiplexer 5 and the Raman-amplification optical fiber 2 are passive components that can relatively easily increase reliability. Therefore, the Raman amplifier 1 becomes reliable to modulate carrier light. Since the Raman amplifier can easily decrease polarization dependency of a gain, this becomes an amplifier of small polarization dependency. Since the Raman amplifier has a wide gain band and has small wavelength-dependency of a gain, the amplifier has small wavelength-dependency. As described afterward in a fifth embodiment, an amplifier having these advantages can modulate an observation signal from an observation device such as an earthquake recorder, a tsunami recorder, a thermometer, and a camera installed on the seafloor, into carrier light, and transmit the carrier light to a receiver installed on land via a submarine cable, thereby achieving a highly reliable remote-controlled seafloor observation system.

Third Embodiment

Figure 3:
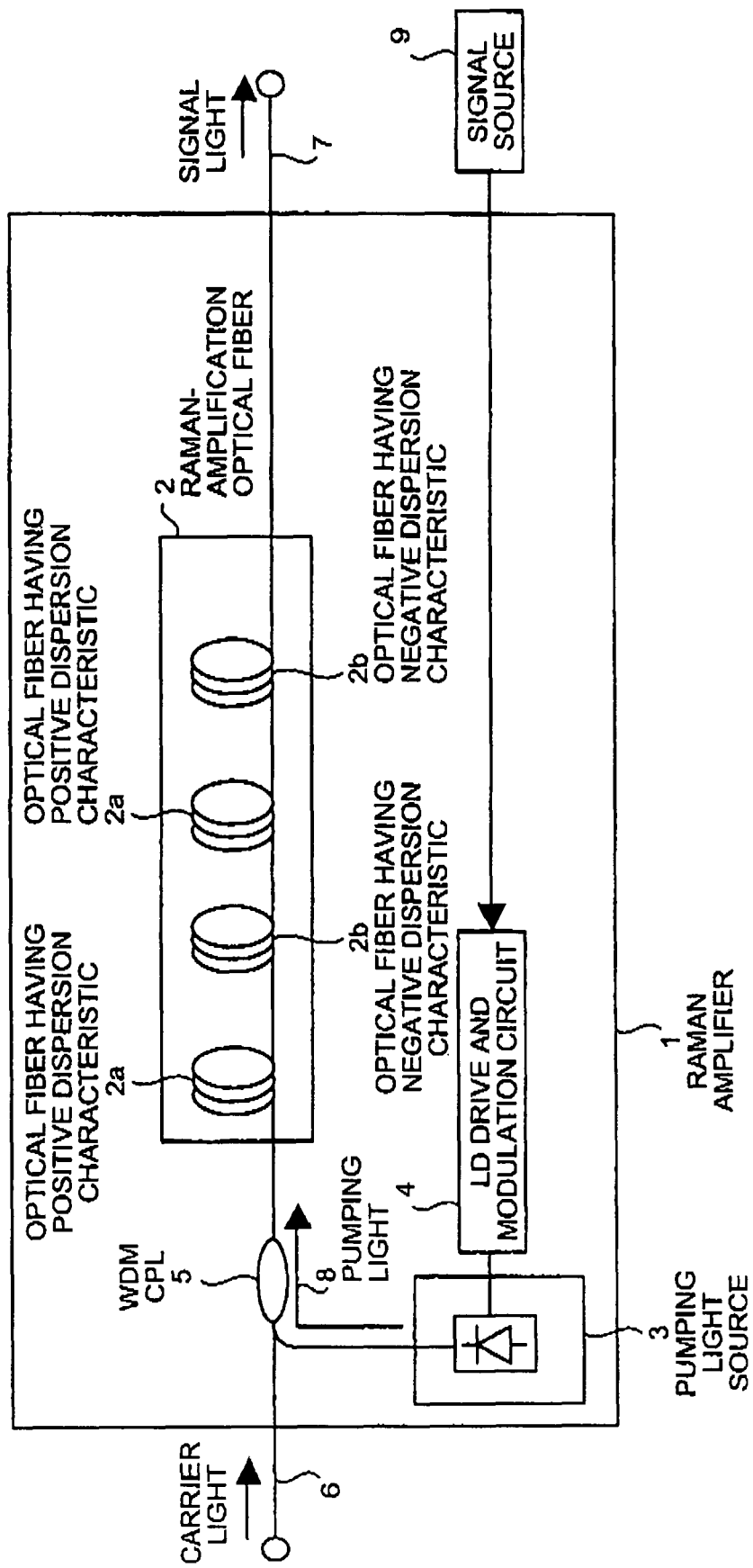
FIG. 3 is a configuration diagram of a Raman amplifier according to a third embodiment.

FIG. 3 is a configuration diagram of a Raman amplifier according to a third embodiment of the present invention. In FIG. 3, the Raman-amplification optical fiber 2 has a configuration in which optical fibers 2a having a positivedispersion characteristic and optical fibers 2b having a negative dispersion characteristic are alternately connected. Other configurations are same to those shown in FIG. 1.

When the optical fibers 2a and 2b are alternately connected to cancel the dispersion characteristics, the dispersion value of the Raman-amplification optical fiber 2 can decrease. For example, when the fibers 2a and 2b have dispersion values of 17 ps/nm/km and −26 ps/nm/km, respectively, and lengths of 3 kilometers and 2 kilometers, respectively, the dispersion value of the Raman-amplification optical fiber 2 is as small as [17 ps/nm/km×3 kilometers+(−26 ps/nm/km)×2 km]×2=−2 ps/nm. Therefore, in the third embodiment, modulation can be performed in a higher frequency, similarly to that performed using the optical fiber 2 having a small dispersion value in the first embodiment and the second embodiment.

Fourth Embodiment

Figure 4:
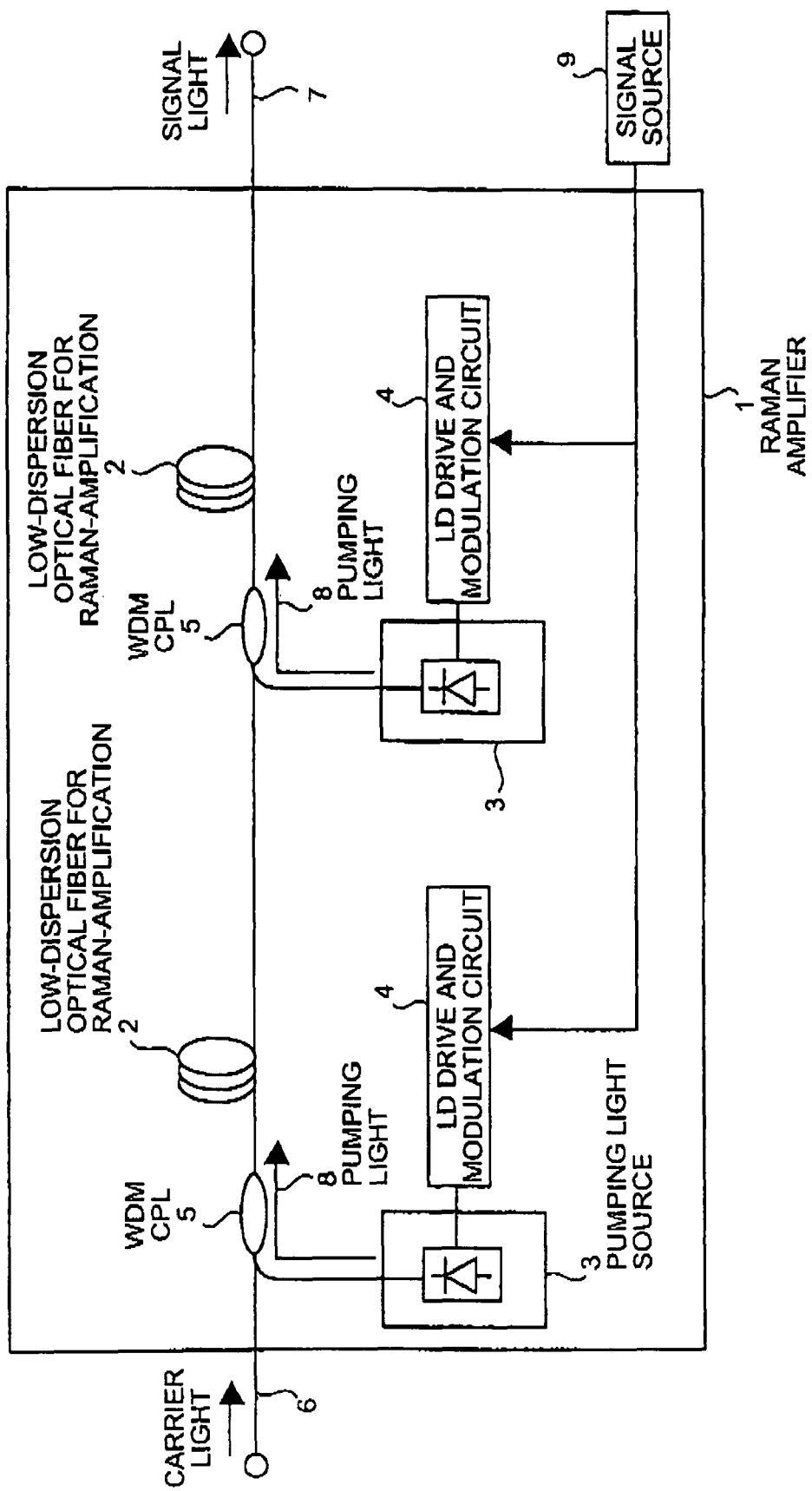
FIG. 4 is a configuration diagram of a Raman amplifier according to a fourth embodiment.

FIG. 4 is a configuration diagram of a Raman amplifier according to a fourth embodiment of the present invention. In the fourth embodiment shown in FIG. 4, two stages of the Raman amplifier shown in FIG. 1 are connected in cascade. Similar to the first embodiment, the carrier light and the pumping light have wavelengths of 1,550 nanometers and 1,450 nanometers, respectively, and the dispersion value of the Raman-amplification optical fiber 2 is 16 ps/nm/km. Each length of the two optical fibers 2 is 3 kilometers that is a half of the length in the first embodiment.

With this configuration, modulation amplitude of the carrier light obtained by one Raman-amplification optical fiber 2 becomes a half. However, since the carrier light is modulated by the two optical fibers 2, sufficiently large modulation amplitude can be obtained similar to the first embodiment. On the other hand, the upper limit of the modulation speed becomes 1/[(absolute value of dispersion value of optical fiber, 0.16 ps/nm/km)×(length of optical fiber, 3 kilometers)×(difference between wavelength of pumping light and wavelength of carrier light, 100 nanometers)]=208 MHz.

Therefore, modulation can be performed in the frequency (208 megahertz) which is two times the frequency in the first embodiment.

Fifth Embodiment

Figure 5:
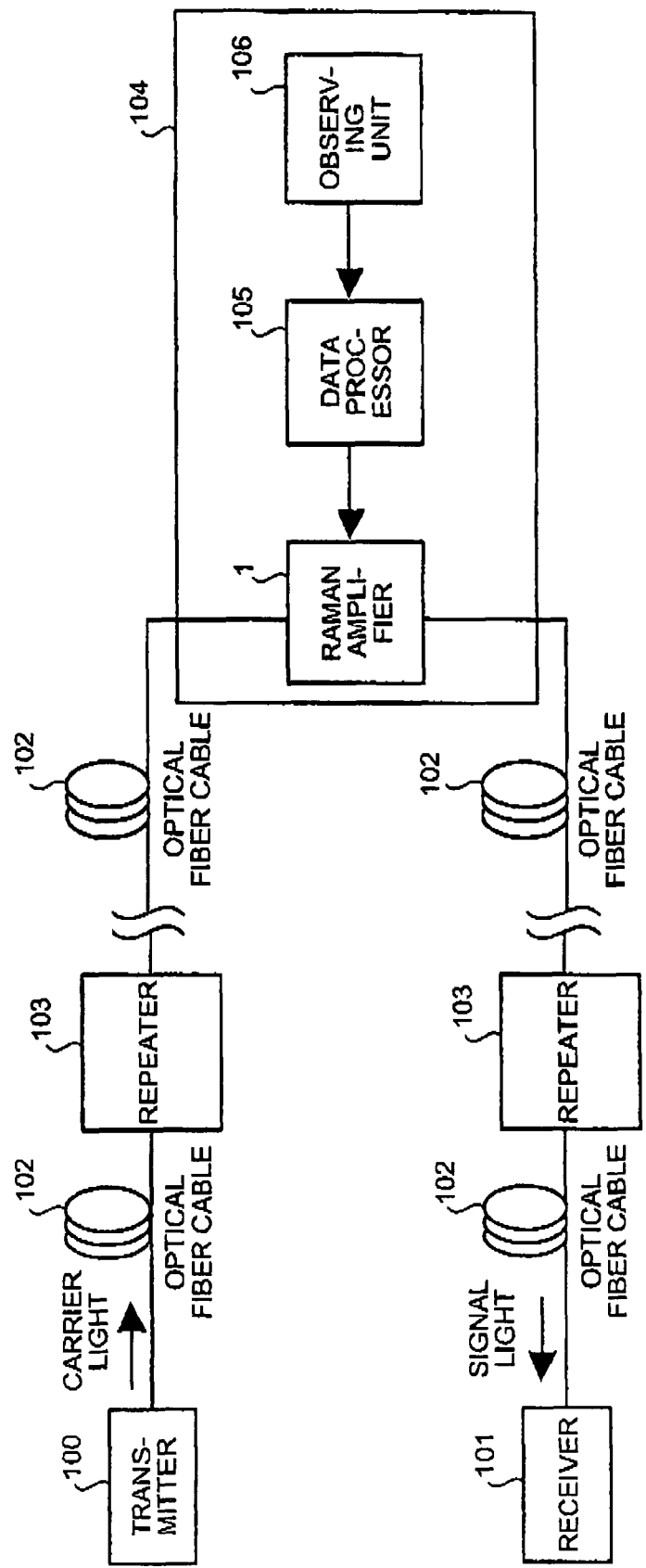
FIG. 5 is a configuration diagram of an optical communication system that uses the Raman amplifier according to a fifth embodiment of the present invention.

FIG. 5 is a configuration diagram of an optical communication system according to a fifth embodiment of present invention that uses the Raman amplifier according to any one of the first to the fourth embodiments. This optical communication system includes a transmitter 100 that transmits wavelength-multiplexed carrier light, a receiver 101 that receives the wavelength-multiplexed carrier light, an optical fiber cable 102, a repeater 103, and an observation device 104. The observation device 104 includes the Raman amplifier 1 according to any one of the first to the fourth embodiments, a data processor 105, and an observing unit 106 such as an earthquake recorder, a tsunami recorder, a thermometer, and a camera.

Wavelength-multiplexed carrier light that is transmitted from the transmitter 100 installed on land is propagated through the optical fiber cable 102 as a submarine cable, and reaches the observation device 104 installed on the seafloor via the repeater 103 that compensates for a propagation loss in the optical fiber cable 102. The observation device 104 includes the observing unit 106 such as an earthquake recorder, a tsunami recorder, a thermometer, and a camera. The data processor 105 executes a required process such as a D/A conversion, a multiplexing, and a sub-carrier modulation of an observation signal. Thereafter, the Raman amplifier 1 modulates carrier light of a part of wavelengths. The wavelength-multiplexed carrier light that is transmitted from the observation device 104 reaches the receiver 101 installed on land, via the optical fiber cable 102 and the repeater 103.

According to this optical communication system, it is possible to achieve a remote-controlled observation system that can transmit an observation signal of the observation device 104 installed on the seafloor to the receiver installed on land. The transmitter 100 and the receiver 101 can be installed in stations at different positions on land, or can be installed in the same station on land. As described in the second embodiment, the Raman amplifier 1 can be achieved in high reliability, and therefore, is suitable for a submarine cable system that is required to have high reliability. Characteristics such as a small size, low loss, low polarization dependency, and low wavelength dependency are preferable to achieve the remote-controlled observation system on the seafloor.

In the above embodiments, the pumping light has a wavelength of 1,450 nanometers, and the carrier light has a wavelength of 1,550 nanometers. However, it is also possible to use carrier light having other wavelength, and pumping light having other wavelength that is suitable to Raman amplify the carrier light. The modulation frequency is not limited to 100 megahertz, and can be an optional frequency which is equal to or higher than 100 megahertz. While an optical fiber using quartz as a base material is exemplified as the Raman amplification medium, other material can be also used. For example, other Raman amplification medium which is suitable for Raman amplification such as an optical fiber using tellurite as a base material can be also used.

INDUSTRIAL APPLICABILITY

As described above, the Raman amplifier according to the present invention is useful for an optical modulator that modulates a signal having a frequency equal to or higher than 100 megahertz. Particularly, the Raman amplifier is preferably used in a seafloor remote-controlled observation system that modulates pumping light, using a signal of an observing unit such as an earthquake recorder, a tsunami recorder, a thermometer, and a camera.

The invention claimed is:

1. A Raman amplifier operatively connected to an observation device, comprising:
   a pumping light source that outputs a pumping light that is intensity-modulated with a frequency higher than 100 megahertz;
   an optical coupler that couples the pumping light having a first propagation time with a carrier light having a second propagation time different than the first propagation time; and
   a Raman amplification medium that is pumped by the pumping light to amplify the carrier light, wherein
   the Raman amplification medium has dispersion properties configured to modulate the carrier light in the frequency higher than 100 megahertz of the pumping light source and wherein the difference between the first propagation time and the second propagation time is such that the Raman amplifier can achieve intensity modulation of higher than 100 megahertz, wherein
   the observation device generates an observation signal, and outputs the observation signal to the Raman amplification medium, and wherein
   the Raman amplification medium modulates the pumping light based on the observation signal, to output the modulated carrier light.

2. The Raman amplifier according to claim 1, wherein the Raman amplification medium is an optical fiber, and an absolute value of a dispersion value of the optical fiber is equal to or less than 1/(a modulation frequency of the pumping light source×a length of the optical fiber×a difference between wavelengths of the pumping light and the carrier light).

3. The Raman amplifier according to claim 1, wherein the Raman amplification medium is an optical fiber, and a Raman gain efficiency of the optical fiber is equal to or higher than 5/W/km.

4. The Raman amplifier according to claim 2, wherein a Raman gain efficiency of the optical fiber is equal to or higher than 5/W/km.

5. The Raman amplifier according to claim 1, wherein the Raman amplification medium is an optical fiber, a wavelength of the pumping light is within a range of 1.4 micrometers to 1.5 micrometers, and a wavelength of the carrier light is within a range of 1.5 micrometers to 1.6 micrometers.

6. The Raman amplifier according to claim 1, wherein the Raman amplification medium includes a plurality of first fibers having positive dispersion and a plurality of second fibers having negative dispersion connected alternately in series.

7. A Raman amplifier operatively connected to an observation device, comprising:
   a plurality of Raman amplifier units that are connected in a cascaded manner, wherein each of the Raman amplifier units includes
      a pumping light source that outputs a pumping light that is intensity-modulated with a frequency higher than 100 megahertz;
      an optical coupler that couples the pumping light having a first propagation time with a carrier light having a second propagation time different than the first propagation time; and
      a Raman amplification medium that is pumped by the pumping light to amplify the carrier light, and
   the Raman amplification medium has dispersion properties configured to modulate the carrier light in the frequency higher than 100 megahertz of the pumping light source and wherein the difference between the first propagation time and the second propagation time is such that the Raman amplifier can achieve intensity modulation of higher than 100 megahertz, wherein
   the observation device generates an observation signal, and outputs the observation signal to the Raman amplification medium, and wherein
   the Raman amplification medium modulates the pumping light based on the observation signal, to output the modulated carrier light.

8. An optical communication system comprising:
   a transmitter that transmits a carrier light;
   a Raman amplifier that receives the carrier light, and outputs a modulated carrier light;
   a receiver that receives the modulated carrier light; and an observation device that generates an observation signal, and outputs the observation signal to the Raman amplifier, wherein the Raman amplifier includes
   a pumping light source that outputs a pumping light that is intensity-modulated with a frequency higher than 100 megahertz;
   an optical coupler that couples the pumping light having a first propagation time with the carrier light having a second propagation time different than the first propagation time; and
   a Raman amplification medium that is pumped by the pumping light to amplify the carrier light,
the Raman amplification medium has dispersion properties configured to modulate the carrier light in the frequency higher than 100 megahertz of the pumping light source and wherein the difference between the first propagation time and the second propagation time is such that the Raman amplifier can achieve intensity modulation of higher than 100 megahertz, and
the transmitter, the Raman amplifier, and the receiver are connected with an optical fiber cable, and wherein
the Raman amplifier modulates the pumping light based on the observation signal, to output the modulated carrier light.

9. The Raman amplifier according to claim 1, wherein the Raman amplifier and the observation device are installed on the seafloor.

10. The Raman amplifier according to claim 9, wherein the observation device comprises at least one of an earthquake recorder, a tsunami recorder, a thermometer, and a camera.

11. The Raman amplifier according to claim 7, wherein the Raman amplifier and the observation device are installed on the seafloor.

12. The Raman amplifier according to claim 11, wherein the observation device comprises at least one of an earthquake recorder, a tsunami recorder, a thermometer, and a camera.

13. The optical communication system according to claim 8, wherein the Raman amplifier and the observation device are installed on the seafloor, and the optical fiber cable is a submarine cable.

14. The optical communication system according to claim 13, wherein the observation device comprises at least one of an earthquake recorder, a tsunami recorder, a thermometer, and a camera.

* * * * *